(12) United States Patent
Malvern et al.

(10) Patent No.: US 10,241,128 B2
(45) Date of Patent: Mar. 26, 2019

(54) ACCELEROMETER CONTROL

(71) Applicant: Atlantic Inertial Systems Limited, Plymouth, Devon (GB)

(72) Inventors: Alan Richard Malvern, Plymouth (GB); Kiran Harish, Plymouth (GB)

(73) Assignee: ATLANTIC INERTIAL SYSTEMS LIMITED, Devon (GB)

( * ) Notice: Subject to any disclaimer, the term of this patent is extended or adjusted under 35 U.S.C. 154(b) by 442 days.

(21) Appl. No.: 15/027,277

(22) PCT Filed: Sep. 22, 2014

(86) PCT No.: PCT/GB2014/052867
§ 371 (c)(1),
(2) Date: Apr. 5, 2016

(87) PCT Pub. No.: WO2015/052487
PCT Pub. Date: Apr. 16, 2015

(65) Prior Publication Data
US 2016/0252544 A1    Sep. 1, 2016

(30) Foreign Application Priority Data

Oct. 9, 2013 (GB) .................................. 1317859.5

(51) Int. Cl.
*G01P 15/125* (2006.01)
*G01P 15/13* (2006.01)
*G01P 15/08* (2006.01)

(52) U.S. Cl.
CPC ............ *G01P 15/125* (2013.01); *G01P 15/13* (2013.01); *G01P 15/131* (2013.01); *G01P 2015/0814* (2013.01)

(58) Field of Classification Search
CPC ...... G01P 15/125; G01P 15/131; G01P 15/11; G01P 15/08; G01P 15/0802; G01P 15/13
See application file for complete search history.

(56) References Cited

U.S. PATENT DOCUMENTS 6,298,709 B1 * 10/2001 Artzner .................... G01D 3/08
73/1.38
6,631,643 B2 * 10/2003 Malvern ............. G01P 15/0802
73/514.32

(Continued)

FOREIGN PATENT DOCUMENTS

EP    0459723 A2    12/1991
EP    1072893 A1    1/2001

(Continued)

OTHER PUBLICATIONS

GB Search Report; Application No. 1317859.5; dated Apr. 15, 2014; 5 pages.

(Continued)

*Primary Examiner* — Helen C Kwok
(74) *Attorney, Agent, or Firm* — Cantor Colburn LLP (57) ABSTRACT

A closed loop method of controlling a capacitive accelerometer uses two servo loops. A Vcrit servo loop uses an output signal (S2) modulated by a sine wave signal (S1). The Vcrit control signal adjusts the magnitude of the PWM drive signals applied to the fixed capacitor electrodes of the accelerometer, thereby optimising open loop gain.

15 Claims, 9 Drawing Sheets

(56) References Cited

U.S. PATENT DOCUMENTS

| 7,267,006 | B2* | 9/2007 | Malvern | G01P 1/006 |
| | | | | 73/514.32 |
| 9,341,646 | B2 | 5/2016 | Stewart | |
| 2007/0028689 | A1* | 2/2007 | Vrcelj | G01P 15/11 |
| | | | | 73/514.17 |
| 2010/0060323 | A1* | 3/2010 | Sumi | G01R 31/31725 |
| | | | | 327/50 |
| 2017/0089947 | A1* | 3/2017 | Townsend | G01P 15/125 |
| 2017/0146562 | A1* | 5/2017 | Durston | G01P 15/131 |
| 2017/0153267 | A1* | 6/2017 | Townsend | G01P 15/125 |
| 2017/0227572 | A1* | 8/2017 | Malvern | G01C 19/5762 |
| 2018/0128851 | A1* | 5/2018 | Malvern | G01P 15/11 |

FOREIGN PATENT DOCUMENTS

| WO | 200151931 | A2 | 7/2001 |
| WO | 2005083451 | A1 | 9/2005 |

OTHER PUBLICATIONS

Notification of Transmittal of the International Search Report and the Written Opinion of the International Searching Authority; EP Patent Office; PCT/GB2014/052867; dated Nov. 19, 2014; 11 pages.

* cited by examiner

ACCELEROMETER CONTROL

FOREIGN PRIORITY

This application claims priority to PCT/GB2014/052867 filed on Sep. 22, 2014 and GB Patent Application No. 1317859.5 filed on Oct. 9, 2013, the entire contents of which is incorporated herein by reference.

TECHNICAL FIELD

The present disclosure relates to systems and methods for controlling accelerometers, in particular capacitive accelerometers.

BACKGROUND

Capacitive accelerometers are typically manufactured from silicon as micro-electromechanical systems (MEMS) devices. These small devices comprise a proof mass moveably mounted relative to a support and sealed so that a gaseous medium trapped inside the device provides damping for the proof mass when it moves in a sensing direction in response to an acceleration being applied. In a capacitive accelerometer, there is typically provided a set of fixed electrodes and a set of moveable electrodes attached to the proof mass, with the differential capacitance between the electrodes being measured so as to detect deflection of the proof mass.

WO 2005/083451 provides an example of a capacitive accelerometer comprising a plurality of inter-digitated electrode fingers extending substantially perpendicular to the sensing direction of the device. Two different sets of fixed electrode fingers form sensing and forcing capacitors. The sensing capacitor fingers are offset compared to the driving capacitor fingers so that when a voltage is applied to the fixed electrode fingers, there is a net attractive force depending on the sign of the voltage difference. The device can be operated in a positive spring rate regime, where the mechanical spring restoring force of the proof mass is greater than the electrostatic attractive force of the capacitor electrodes, or a negative spring rate regime, where the electrostatic force exceeds the mechanical restoring force e.g. when higher voltages are applied to the fixed capacitor electrodes. A null position is achieved for the proof mass, where the electrostatic forces match the mechanical spring restoring forces and inertial forces.

In one approach, the same electrode fingers can be used for both driving and sensing. For example, time division multiplexing can be used, where a certain portion of time is spent in sensing displacement of the proof mass and the remaining time is spent in driving the capacitor electrodes. However, without continuous sensing the null condition may not be calculated accurately and therefore noise will typically be high.

In another approach, a pulse width modulation (PWM) technique may be used to control the voltage waveforms supplied to the driving electrodes. An in-phase PWM waveform is applied to a first set of fixed electrodes while an anti-phase PWM waveform is applied to a second set of fixed electrodes. In such a PWM regime the mark/space ratio varies with applied acceleration and provides a linear measure of acceleration. If there is a net force acting on the proof mass then the output signal includes an error bias representing how far away from the null position the proof mass is. This output signal may be used by a PWM servo to define the mark/space ratio applied by a PWM generator.

In WO 2005/083451 a PWM servo adjusts the time difference of the mark/space ratio of the PWM signals driving the electrode fingers. This linearises the output of the accelerometer with input acceleration. The magnitude of the in-phase and anti-phase PWM waveforms applied to the electrodes by the PWM generator is set at a constant reference voltage Vref, typically 25V. This voltage Vref is a constant fixed voltage because it defines the gain accuracy of the accelerometer. The fixed voltage Vref also ensures that the PWM mark/space ratio is a linear function of applied acceleration, so it is important to keep Vref constant. Varying the voltage Vref would give rise to a force depending on Vref2, which would give an undesirable non-linearity. In practice, the fixed value of Vref determines the operational g range of the accelerometer.

The use of a PWM approach allows both sensing and forcing at the same time. Sensing is achieved by detecting the voltage on the proof mass. During the in-phase PWM drive period the proof mass voltage is given by the gap with respect to the first set of electrodes and during the second half cycle anti-phase PWM drive period, the proof mass voltage is given by the gap with respect to the second electrode set. The difference in voltage between the first and second half cycles gives a measure of the offset of the proof mass position with respect to the null position. Thus after a completed cycle both sensing and forcing have been obtained.

Variations in the system, such as temperature variations and/or mechanical variations in the construction of the accelerometer, can change the inter-digitation gap between the electrode fingers and the proof mass. Previously such changes were compensated by the varying mark/space ratio, to maintain the proof mass at the null position at all times. The voltage at this operating point may be considered a critical voltage Vcrit. However an open loop accelerometer is unstable at the Vcrit position, meaning that the proof mass will always tend to be biased away from the null position. It is known that the resonance frequency ω of the proof mass determines the open loop gain of an accelerometer. The open loop gain is defined by the detection of the proof mass per unit of acceleration. The gain is proportional to $1/\omega^2$. It is known that open loop gain can be increased by reducing the resonance frequency ω, but this also limits the maximum acceleration g that can be detected. This is because the value of Vcrit varies as $\omega^2$, so a lower resonance frequency reduces Vcrit and therefore reduces the maximum acceleration g that can be detected. Above Vcrit, obtaining loop stability becomes progressively harder as the loop is then conditionally stable, so there is an effective maximum voltage, and hence g range, that can be obtained. Many applications require a high g range to be detected so the conventional approach is limited in its practical use.

It would be desirable to improve the accelerometer head gain without reducing resonance frequency. Maximising the head gain implies that the proof mass moves further under an impulse, so that it is there is a bigger signal on the proof mass to act as an error signal for the PWM servo to operate against. This increased head gain will give rise to a better loop lock which is ultimately determined by noise in the system, so a bigger signal to noise ratio may be obtained.

Driving the fixed electrodes at higher voltages, so as to achieve a negative spring rate regime, can increase the g range. However, operating in the negative spring rate regime can also cause difficulty in achieving loop stability, with a poor overall closely frequency response where loop filtering becomes more critical and dependent on the detailed MEMS fabrication tolerances.

It would be desirable to increase the acceleration g range of an accelerometer, without reducing the open loop gain, and to maximize the head gain.

SUMMARY

According to a first aspect of this disclosure there is provided a closed loop method of controlling a capacitive accelerometer comprising a proof mass moveable relative to first and second fixed capacitor electrodes, the method comprising: applying in-phase and anti-phase pulse width modulation (PWM) drive signals to the first and second fixed capacitor electrodes with an adjustable mark/space ratio; operating in closed loop so that mechanical inertial forces are balanced by electrostatic forces to maintain the operating point of the proof mass at a null position; detecting an output signal from the accelerometer representing a displacement of the proof mass from the null position to provide a error signal; using the error signal so as to vary the mark/space ratio of the PWM drive signals so that the accelerometer output signal is proportional to acceleration; adding a sine wave modulation at a frequency f to the output signal from the proof mass before providing the error signal; further detecting a phase shift resulting from the sine wave modulation at the frequency f so as to recognise a critical drive signal magnitude Vcrit representing the null position; and providing a Vcrit control signal so as to adjust the magnitude of the PWM drive signals applied to the first and second fixed capacitor electrodes, or applying a separate, adjustable drive signal to at least one further fixed capacitor electrode, to lock to Vcrit and thereby optimise open loop gain Thus in accordance with this disclosure it has been recognised that there is a critical transition between the positive and negative spring rate regimes and it can be beneficial to drive fixed capacitor electrodes in the system so as to ensure that this optimum condition is achieved. In order to sense an offset from the critical transition, an additional sine wave modulation at a frequency f, for example a low frequency signal (typically 10-100 Hz), is added to the output signal from the proof mass before providing the error signal. This results in a low frequency modulation of the PWM drive signals that perturbs the position of the proof mass at the frequency f.

Normally the overall open loop transfer function (OLTF) output signal from the proof mass would have a −270° phase shift at voltages above the null position represented by Vcrit (i.e. negative spring rate regime). By adding the modulation signal, it is possible to sense the 90° phase shift at the modulation frequency, resulting in a detectable 180° phase shift in the OLTF that can be used to recognise the voltage signal magnitude Vcrit. To aid in detecting the phase shift resulting from the sine wave modulation, the method may comprise integrating the output signal after the sine wave modulation has been added. In the positive spring rate regime (voltage below Vcrit) there is a −90° phase shift in the OLTF at low frequency provided by the presence of an integrator in the loop filter function. For the accelerometer, the transfer function at low frequency and in the positive spring rate regime has a 0° phase shift, which changes to a −180° phase shift in the negative spring rate regime. Thus a 90° phase shift of the accelerometer output signal corresponds to Vcrit. When added to the −90° phase shift from the loop filter integrator (at low frequency) this gives a −180° phase shift. This enables an additional Vcrit servo to lock to the optimum operating point in a second closed loop control.

The method disclosed herein effectively employs an additional closed loop control using the Vcrit control signal. In addition to a PWM servo that applies the error signal to adjust the mark/space ratio of the PWM drive signals and stabilize the proof mass at the null position, there is disclosed a Vcrit servo that adjusts the magnitude of one or more drive signals to match Vcrit. The method uses detection of a −90° phase shift in the accelerometer transfer function to run the Vcrit servo.

By driving the fixed capacitor electrodes at the critical voltage Vcrit, the open loop gain of the accelerometer is highest at low frequency so this is an ideal operating point. Noise is also reduced, as proof mass deflection is minimised under the application of an external perturbation. The additional servo mode can be used to achieve high stability and linearity. Such a control method therefore provides for superior performance, especially in the low frequency range. In particular, the maximum head gain is obtained at Vcrit at low frequency.

According to this disclosure, the Vcrit condition may be achieved using a second closed loop control by adjusting the magnitude of the PWM drive signals, or by applying a separate drive signal to a further fixed capacitor electrode.

In a first set of examples, the method comprises directly adjusting the magnitude of the PWM drive signals applied to the first and second fixed capacitor electrodes, e.g. adjusting the PWM supply voltage.

In another set of examples, the method comprises adjusting the magnitude of the drive signal applied to at least one further fixed capacitor electrode. This may involve separately adjusting a "trim" voltage Vtrim applied to a further fixed e.g. trim electrode. Ideally the at least one further fixed capacitor electrode is independent of the first and second fixed capacitor electrodes. The trim voltage Vtrim may then be varied e.g. under servo control to maintain the optimum operating point at Vcrit. An advantage of applying an adjustable drive signal to at least one further fixed capacitor electrode is that this "trim" electrode can apply an extra electrostatic spring stiffness to match the mechanical spring constant to the electrical spring constant without affecting the scale factor of the accelerometer. Adjusting the VHT will cause the scale factor to change when Vcrit is sought by the second servo as the scale factor varies with V^2 so this approach (without trim electrodes) is less favoured.

In various examples of the present disclosure, the method may comprise injecting a low frequency sine wave modulation signal S1 and detecting (e.g. after a summing point) the 90° phase shift from the output signal, e.g. 90° antiphase. Of course the modulation signal S1 may comprise either a sine or cosine waveform. This allows the Vcrit operating point to be determined so as to generate a control signal used in a second feedback loop to adjust the magnitude of the PWM drive signals applied to the first and second fixed capacitor electrodes, or to adjust a separate drive signal applied to at least one further fixed capacitor electrode. The modulated signal may be used to determine the open loop transfer function (OLTF).

In addition, or alternatively, the method may comprise demodulating and digitising an output voltage from the accelerometer so as to provide a digital output signal, e.g. before summing with a sine wave modulation signal S1 and providing control signals to the PWM and Vcrit servo loops. The servos may therefore operate in the digital domain. The sine wave modulation signal S1 may be a digital signal that is summed with the digital output signal.

So as to remove the effect of the sine wave modulation before adjusting the drive signals, the method may further comprise adding a quadrature signal S3 inside the Vcrit servo loop that is in anti-phase to the sine wave modulation signal S1, and therefore in 180° anti-phase to the acceleration output signal. Thus the modulated signal may be demodulated, after providing the error signal, in the downstream Vcrit servo loop. The quadrature signal S3 may be a digital signal that is summed with the output signal in a demodulator as part of the Vcrit servo. Adding the S3 signal removes from the output signal the modulation signal S1 that has been injected upstream. This demodulated signal is then used to drive the Vcrit servo to set the correct Vcrit operating point.

In addition to the demodulation described above for the Vcrit servo loop, the method may comprise demodulating the accelerometer output signal outside the servo loops, after adding the sine wave modulation signal S1, so as to extract an output signal. The method may further comprise providing the extracted output signal as a measurement of the acceleration acting on the proof mass. The output signal may therefore be demodulated outside the servo loops so as to remove the sine wave modulation. The method may therefore comprise subtracting the modulated output signal with an in-phase signal S4 to remove the modulation Si before measuring acceleration.

According to a second aspect of this disclosure there is provided an accelerometer closed loop control system comprising: a capacitive accelerometer comprising a proof mass moveable relative to first and second fixed capacitor electrodes; a pulse width modulation (PWM) generator arranged to apply in-phase and anti-phase PWM drive signals to the first and second fixed capacitor electrodes with an adjustable mark/space ratio; a PWM servo operating in closed loop so that mechanical inertial forces are balanced by electrostatic forces to maintain the operating point of the proof mass at a null position; an output signal detector arranged to detect an output signal from the accelerometer representing a displacement of the proof mass from the null position to provide an error signal, wherein the PWM servo uses the error signal to vary the mark/space ratio of the PWM drive signals so that the accelerometer output signal is proportional to acceleration; a modulator arranged to add a sine wave modulation at a frequency f to the output signal before providing the error signal to the PWM servo; and a Vcrit servo. The Vcrit servo is arranged to: detect a phase shift resulting from the sine wave modulation at the frequency f so as to recognise a critical drive signal magnitude Vcrit representing the null position; and provide a Vcrit control signal to adjust the magnitude of the PWM drive signals applied to the first and second fixed capacitor electrodes, or to apply a separate drive signal to a further fixed capacitor electrode, to lock to Vcrit and thereby optimise open loop gain.

In one set of examples, the Vcrit servo adjusts the magnitude of the drive signal(s) applied to at least one further fixed capacitor electrode. The one or more further fixed capacitor electrodes may be considered "trim" electrodes. Ideally the trim electrode(s) is/are independent of the first and second fixed capacitor electrodes. The trim electrodes are configured so that they affect the spring stiffness, without imparting any forces similar to the inertial force. Thus the trim electrodes do not affect the operation of the PWM servo but affect the operating point with respect to Vcrit, where there is a electrostatic spring constant that equals the mechanical restoring spring constant.

Each of the first and second fixed capacitor electrodes may comprise a plurality of laterally spaced, fixed capacitive electrode fingers arranged to interdigitate with a set of laterally spaced, moveable capacitive electrode fingers extending from the proof mass. The at least one further fixed capacitor electrode may comprise a plurality of laterally spaced, fixed capacitive electrode fingers that are not inter-digitated with the moveable capacitive electrode fingers.

A closed loop control system as disclosed herein may be configured to carry out any of the method steps described above. For example, the modulator may be arranged to inject a modulation signal S1. This means that the open loop transfer function (OLTF) can be determined. Furthermore, a demodulator may be arranged to detect a quadrature signal, that is in 90° anti-phase to the modulation signal S1 after summing the modulated signal into the loop, after providing the error signal and/or before providing the Vcrit control signal. The system may include one or more such demodulators. The output of the demodulator drives the Vcrit servo forming the error signal as input to the Vcrit loop filter. The Vcrit loop filter is typically an integrator. The output of the Vcrit loop filter is a voltage that sets the trim voltage on the trim electrodes or adjusts the magnitude VHT of the PWM drive voltages.

BRIEF DESCRIPTION OF DRAWINGS

One or more non-limiting examples will now be described, with reference to the accompanying drawings, in which.

DETAILED DESCRIPTION

Figure 1:
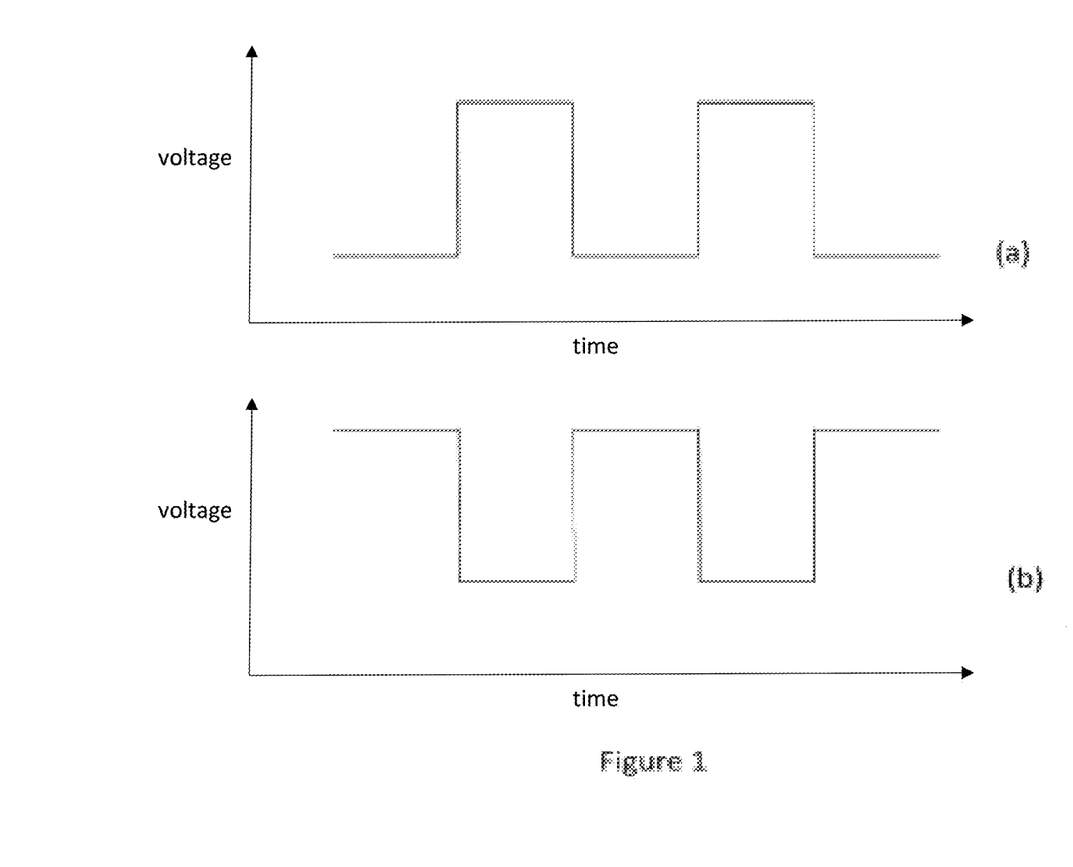
FIG. 1 demonstrates an exemplary pair of PWM voltage waveforms applied to first and second fixed capacitor electrodes.

FIG. 1 provides a typical example of the voltage waveforms (a) applied to a first set of fixed electrode fingers and (b) applied to a second set of fixed electrode fingers in an accelerometer of the variable capacitance type. The two voltage waveforms are in anti-phase, in the form of a square wave, with the voltage amplitude varying between 0V and VHT. Using pulse width modulation (PWM), the mark/space ratio can be varied so that the electrostatic forces null out the inertial forces and the ratio remains linear with the applied acceleration. However, the electrostatic forces applied by the fixed electrode fingers depends on the magnitude VHT of the supply voltage and this is not varied in the prior art.

Figure 2:
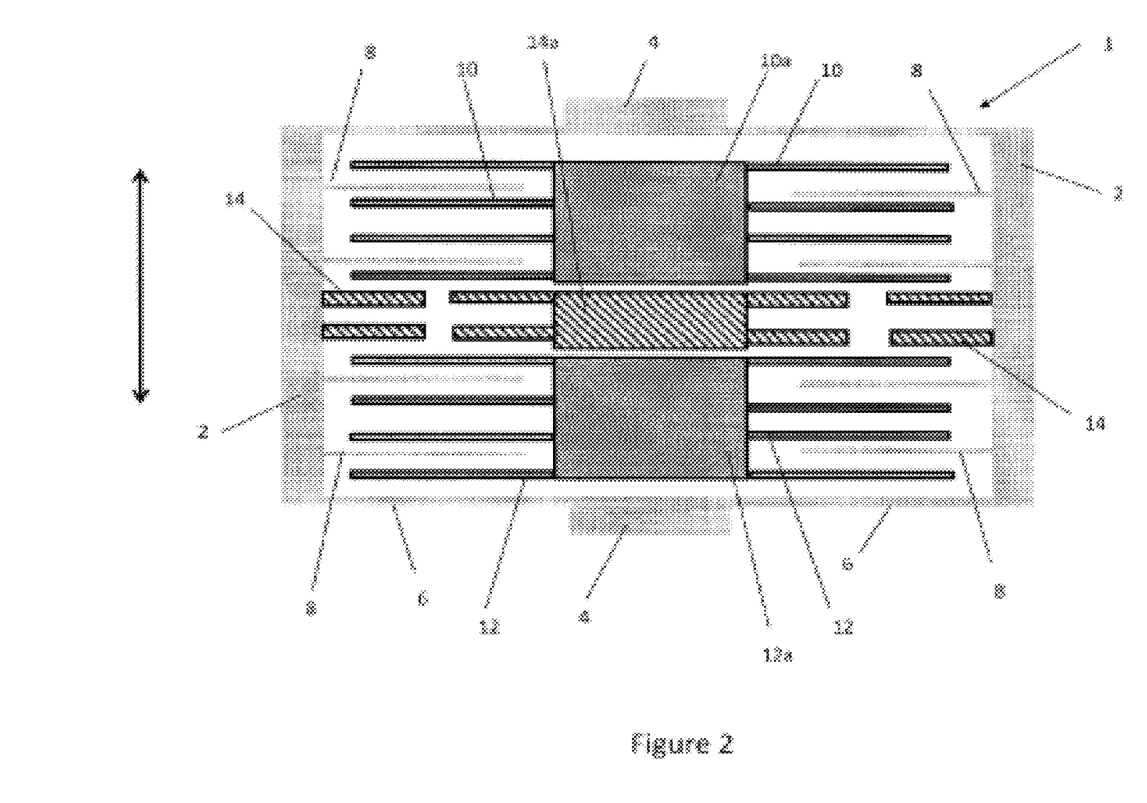
FIG. 2 provides a first example of a capacitive accelerometer comprising interdigitated electrode fingers and an additional fixed trim electrode.

FIG. 2 is a schematic illustration of a capacitive accelerometer 1 comprising a moving proof mass 2 that is provided by an outer frame. The proof mass 2 is attached to a base substrate (not shown) by a pair of central anchors 4. The anchors 4 may be bonded, e.g. anodically bonded to the base substrate (such as a glass substrate). Flexures 6 extend between the anchors 4 and the outer frame 2 so that the proof mass is able to move in response to linear acceleration in the direction of the arrow i.e. the sensing direction. A plurality of laterally spaced, moveable capacitive electrode fingers 8 extend from the proof mass 2 in a direction substantially perpendicular to the sensing direction. The moveable electrode fingers 8 are interdigitated with various fixed electrode fingers.

A first set of fixed electrode fingers 10 extend from a first central support 10a to interdigitate with the moveable electrode fingers 8. A second set of fixed electrode fingers 12 extend from a second central support 12a to interdigitate with the moveable electrode fingers 8. It can be seen that the first set of fixed fingers 10 has a first lateral offset from the moveable electrode fingers 8 in one direction parallel to the sensing direction, while the second set of fixed fingers 12 has a second lateral offset in the opposite direction. The first and second lateral offsets may be equal in size.

A further feature of the capacitive accelerometer 1 seen in FIG. 2 is that the first and second sets of fixed electrode fingers 10, 12 are laterally separated by an additional set of fixed "trim" electrodes 14. The fixed trim electrodes 14 are shown as laterally spaced electrode fingers that extend between a fixed central support 14a and the outer moving frame of the proof mass 2, but without interdigitating with any of the moveable electrode fingers 8. However the fixed trim electrodes 14 may take any suitable form, including a single electrode rather than multiple electrode fingers. The fixed trim electrodes 14a may have a separately adjustable voltage to the PWM voltage waveforms applied to the first and second sets of fixed electrode fingers 10, 12. The fixed electrodes on the proof mass 14 are at a virtual ground (i.e. effectively 0V) set by a charge amplifier attached to the proof mass 2. The additional trim voltage Vtrim may be adjusted to maintain operation of the accelerometer 1 at a zero-stiffness position, where the net electrostatic attractive forces applied by the fixed electrodes 10, 12, 14 exactly match the mechanical spring restoring force of the proof mass 2.

Figure 3:
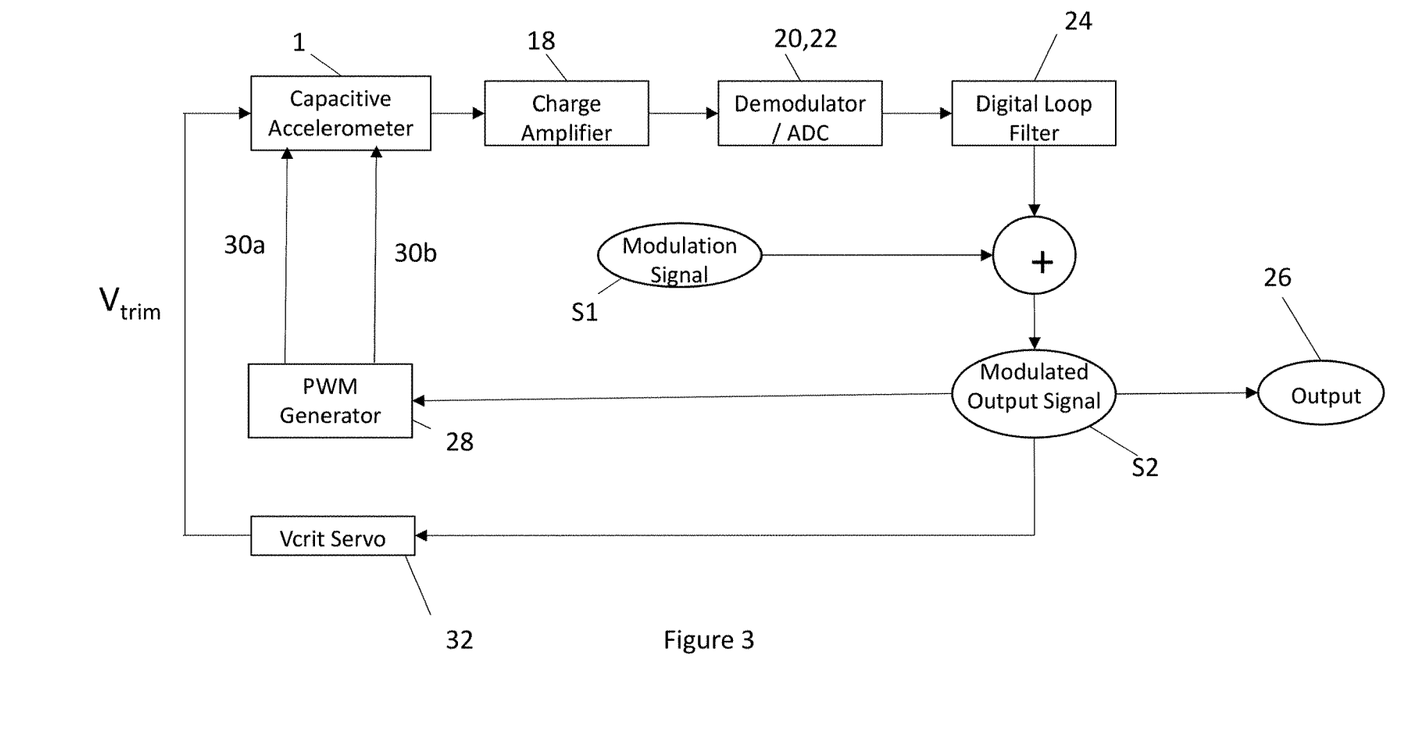
FIG. 3 illustrates an exemplary system overview for servo control of the accelerometer of FIG. 2.

The accelerometer 1 seen in FIG. 2 may be controlled by a control system comprising two servo loops as illustrated by FIG. 3. An output signal from the accelerometer 1 represents an applied acceleration as detected by displacement of the proof mass 2. Under closed loop conditions the proof mass 2 does not move and the mark/space ratio, giving a balancing electrostatic force, is a linear measure of the applied acceleration. The output signal passes through a charge amplifier 18 which is physically connected to the proof mass 2. The charge amplifier 18 is any circuit whose equivalent input impedance is a capacitance that provides a very high value of impedance at low frequencies. The output signal at the PWM frequency is then demodulated by a demodulator 20 for the first servo loop and digitised by ADC 22, before passing through a digital loop filter 24. This voltage output sets the PWM ratio through the PWM generator 28, to give the two anti-phase PWM drive signals 30a and 30b applied to the two sets of fixed fingers 10a and 12a. This represents the normal operation of the accelerometer 1 without a Vcrit servo 32 in place.

The output of the digital loop filter 24 is summed with a digital sine wave modulation signal S1 before being passed to a Vcrit servo loop 32. In order to sense the offset from the Vcrit condition, the additional sine wave modulation signal S1 is added to the summing point in the loop. This has the effect of modulating the position of the proof mass 2 at this frequency. Above Vcrit there is a 180° phase shift through the accelerometer while below there is 0° phase shift. At Vcrit there is a 90° phase shift. The modulation frequency (typically 10-100 Hz) of the signal S1 is a monitor of this phase, so the 90° phase point i.e. Vcrit can be detected.

The modulated output signal S2 may be used to determine the open loop transfer function (OLTF) at this particular frequency. The OLTF is determined from the ratio of the output signal after the summing point to the injected signal S1. This can be determined when the accelerometer 1 is operated closed loop in normal operation. The digital output S2 after the summing point may be extracted at an output 26. Although not shown, the signal from the output 26 may be filtered and/or demodulated in the same way as will be described with respect to FIG. 7 below.

The modulated output signal S2 is used after the summing point to provide closed loop feedback in two different ways. Firstly, the modulated output signal S2 is supplied to the PWM generator 28 to provide for PWM servo control. As in the prior art, the error signal is used to set the mark/space ratio applied by the PWM generator 28 when driving the accelerometer 1 using an in-phase PWM voltage waveform 30a and an anti-phase PWM voltage waveform 30b applied to the first and second sets of fixed electrode fingers 10, 12. Secondly, the modulated output signal S2 is supplied to the additional Vcrit servo 32. The servo 32 applies a separate, adjustable drive signal to the fixed trim electrodes 14. The magnitude of the voltage Vtrim applied the fixed trim electrodes 14 is adjusted so as to lock to the critical transition voltage Vcrit where the open loop gain is maximised.

Figure 4:
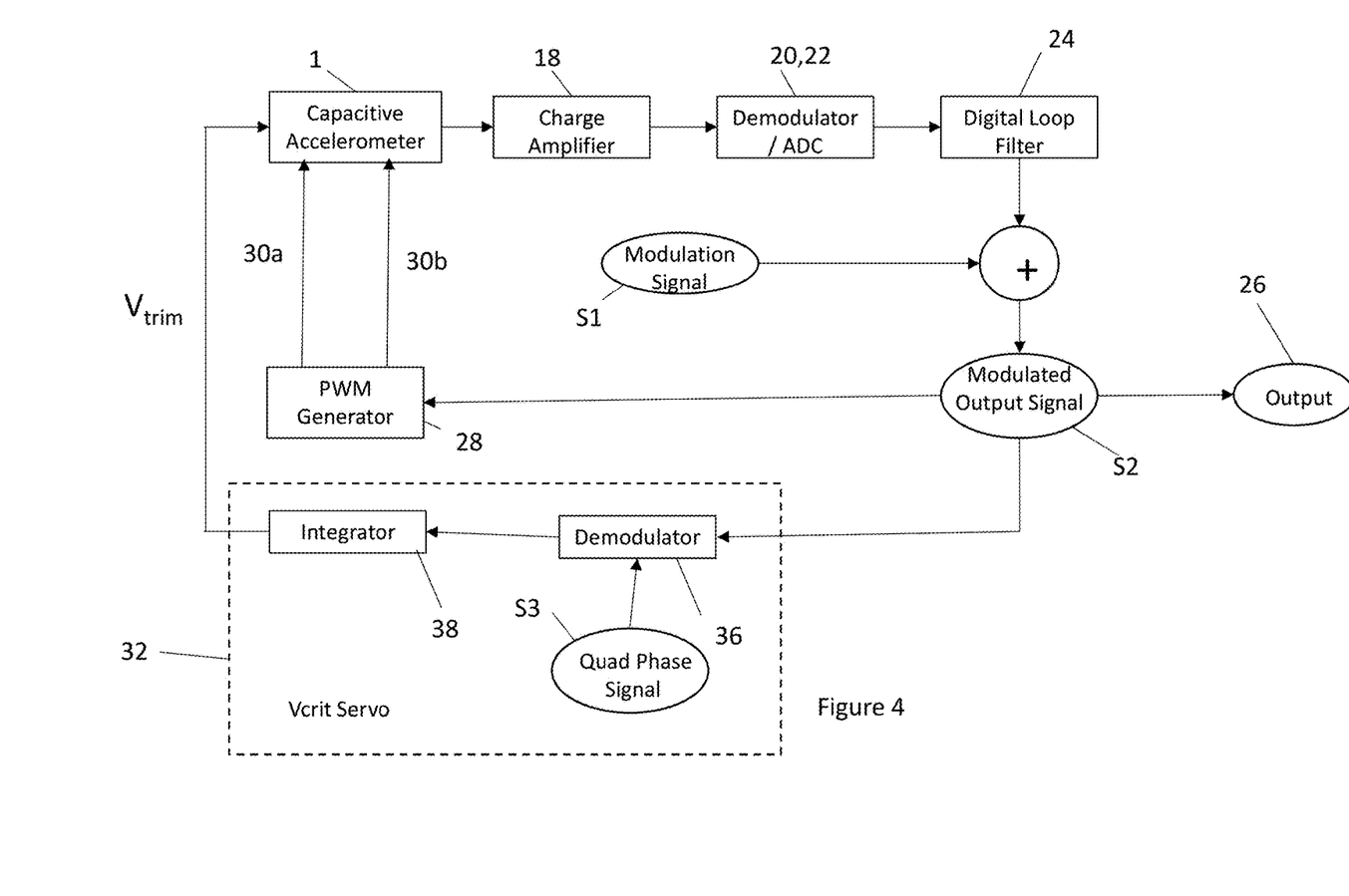
FIG. 4 illustrates the servo control of FIG. 3 in more detail.

FIG. 4 shows the Vcrit servo 32 in more detail. A quadrature signal S3, that is in 90° anti-phase to the modulation signal S1, is generated for a demodulator 36 to be summed with the output signal S2. In the Vcrit servo 32, the post-summing signal S2 is passed through the demodulator 36 and an integrator 38 to generate the voltage Vtrim applied to the fixed trim electrodes 14.

In the positive spring rate regime the OLTF has a −90° phase shift at low frequency. In the negative spring rate regime the OLTF has a −270° phase shift, due to the extra 180° corresponding to the negative spring rate. Thus at Vcrit there is a 180° phase shift in the OLTF, so the Vcrit servo 32 needs to hold the 180° phase shift of the OLTF.

At Vcrit there is a 180° phase shift at the low frequency of the modulation signal S1 at the proof mass output, so at this value the quadrature phase signal S3 at the frequency of S1 is zero. This may be detected by demodulating the output of the charge amplifier 18 at the frequency of S1. As S1 is digitally produced within the accelerometer it will be possible to create a reference signal S3 in quadrature at S1 frequency. This can be done by successively adding and subtracting each half cycle at the frequency of S1 in quadrature with the S1 signal. This then forms the demodulated signal of the Vcrit servo 32. This signal will be zero at Vcrit at the 0° phase point. This therefore acts as an error signal which is input to the integrator 38. The output of the integrator 38 is then used to set the voltage Vtrim on the trim electrodes so that the servo 32 is aiming to hold the output of the charge amplifier 18 at a null for the quadrature phase signal (i.e. there is a −180° phase shift from the OLTF).

Figure 5:
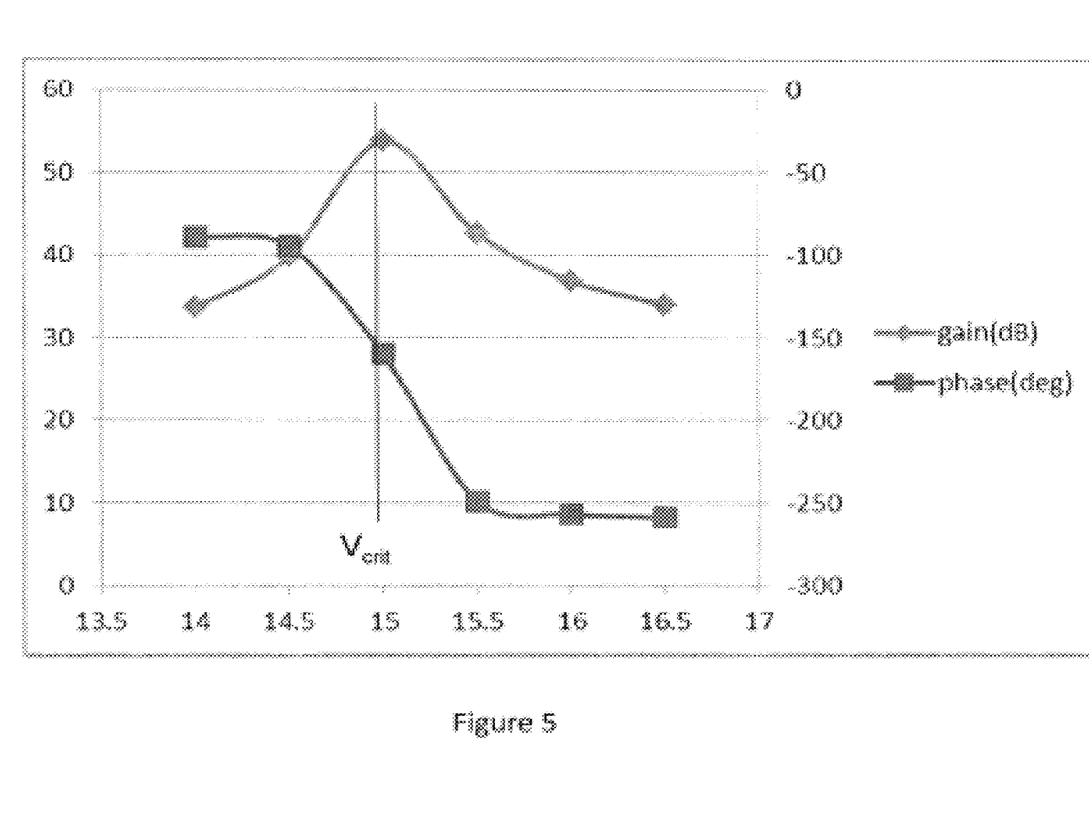
FIG. 5 shows a plot of open loop gain and phase as a function of applied voltage.

FIG. 5 illustrates how the open loop gain of the accelerometer 1 reaches a maximum at a critical voltage Vcrit (15 V, in this example) where the overall electrostatic spring rate matches the mechanical spring rate, i.e. the proof mass is effectively free of both forces. The null position of the proof mass is separately determined by the first servo loop by adjusting the PWM mark/space ratio. It can be seen that this coincides with an OLTF phase of −180°.

Figure 6:
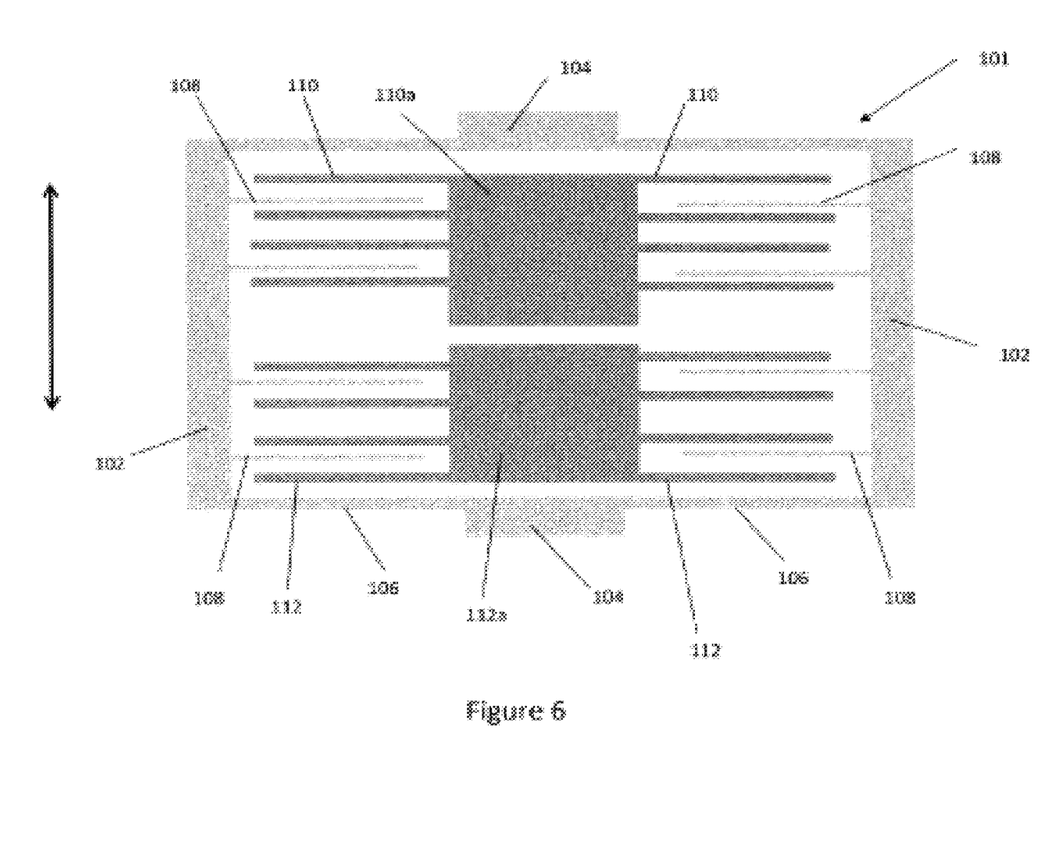
FIG. 6 provides a second example of a capacitive accelerometer comprising interdigitated electrode fingers without a trim electrode.

FIG. 6 is a schematic illustration of another capacitive accelerometer 101 comprising a proof mass 102 in the form of moving outer frame. As before, the proof mass 102 is attached to a pair of central anchors 104 by lateral flexures 6 so that it can move in response to linear acceleration in the direction of the arrow i.e. the sensing direction. A plurality of laterally spaced, moveable capacitive electrode fingers 108 extend from the proof mass 102 in a direction substantially perpendicular to the sensing direction. The moveable electrode fingers 108 are interdigitated with two sets of fixed electrode fingers 110, 112. Each of the first and second sets of fixed electrode fingers 110, 112 extend from respective first and second central supports 110a, 112a with opposite lateral offsets from the moveable electrode fingers 108.

It can be seen that the accelerometer 101 does not include any additional trim electrodes. However, it is still possible to achieve Vcrit using servo control, as is show by the schematic system overview of FIG. 7. In this example, the output signal from the accelerometer 101 is passed through a demodulator 120, ADC 122 and a loop filter 124 before a sine wave modulation signal S1 is injected. The post-summing output S2 can be passed through a low pass filter 126 before being demodulated by subtracting a signal S4 that is in-phase with the modulation signal S1 to create a final output free of modulation. The post-summing output S2 is also used to provide closed loop feedback in two different ways. Firstly, the modulated output signal S2 is supplied to a PWM generator 128. As in the prior art, the output signal S2 is used to set the mark/space ratio applied by the PWM generator 128 when driving the accelerometer 101 using an in-phase PWM voltage waveform 130a and an anti-phase PWM voltage waveform 130b applied to the first and second sets of fixed electrode fingers 110, 112. Secondly, the modulated output signal S2 is supplied to an additional Vcrit servo 132. The servo 132 adjusts the magnitude VHT of the PWM drive signals applied to the first and second fixed capacitor electrodes 110, 112. Even without any trim electrodes, the servo 132 can tune the accelerometer 101 to the critical transition voltage Vcrit where the electrostatic forces of the fixed electrodes 110, 112 match the inertial forces and the proof mass 102 is at the null position with a maximum in the open loop gain.

Figure 7:
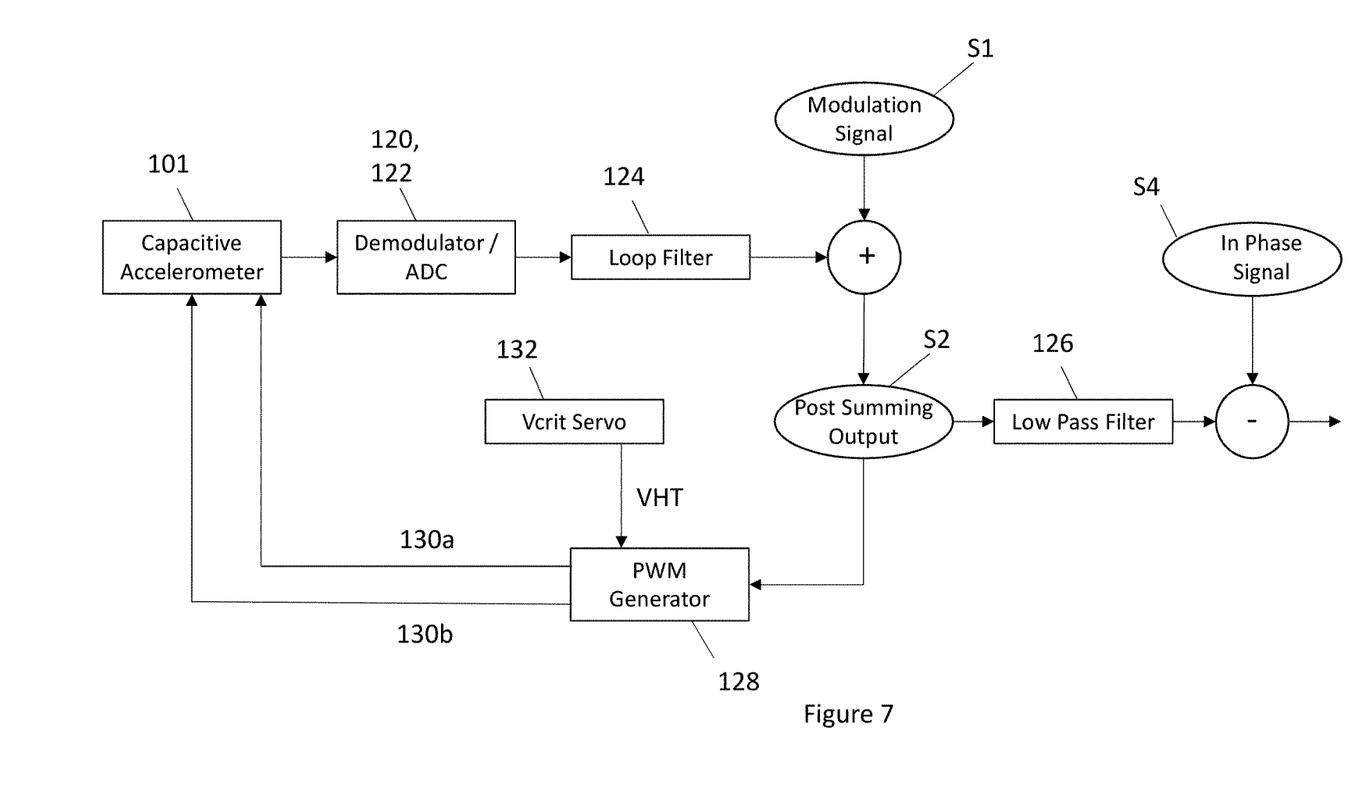
FIG. 7 illustrates an exemplary system overview for servo control of the accelerometer of FIG. 6.

Although not shown in FIG. 7, it will be appreciated that the Vcrit servo 132 may optionally include a demodulator and an integrator in the same way as the servo 32 seen in FIG. 4. For example, a quadrature signal S3, that is in 90° anti-phase to the modulation signal S1, may be used for demodulation before generating the control signal driving the fixed electrodes 110, 112 at VHT.

Figure 8:
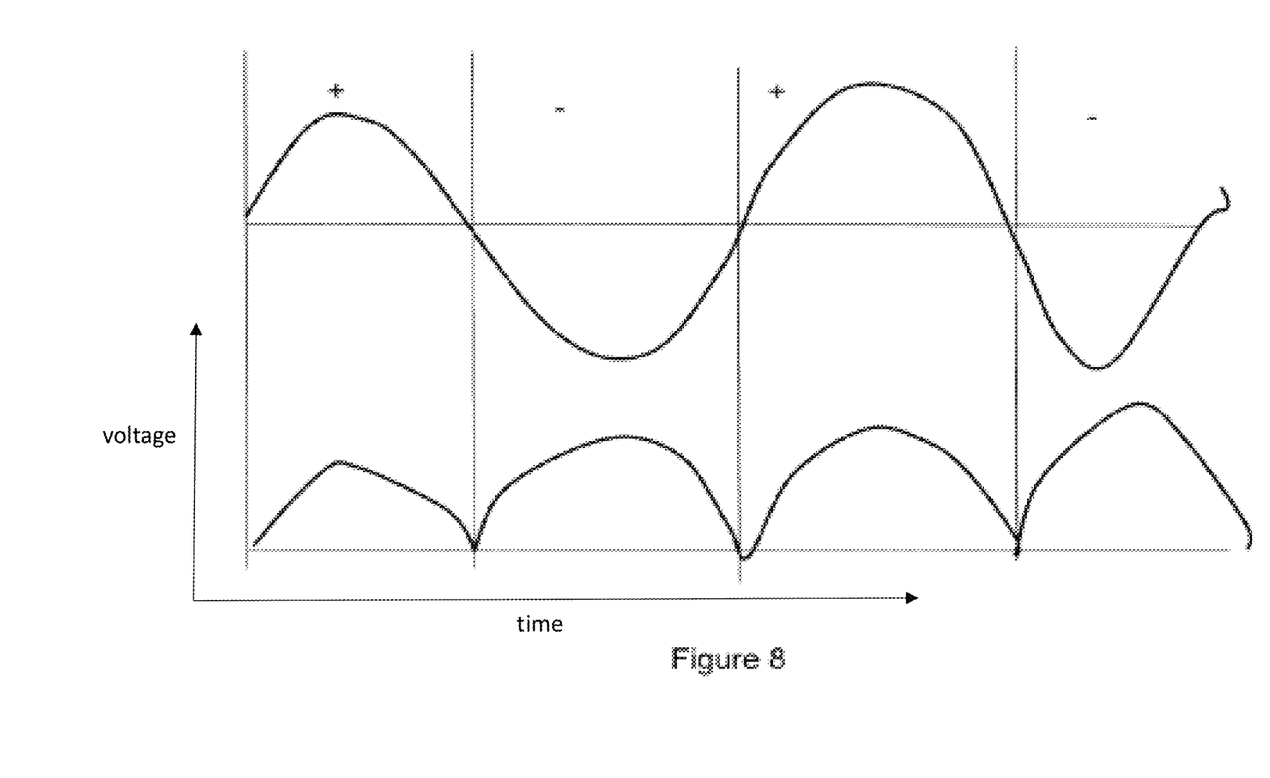
FIG. 8 illustrates an in-phase demodulator.
Figure 9:
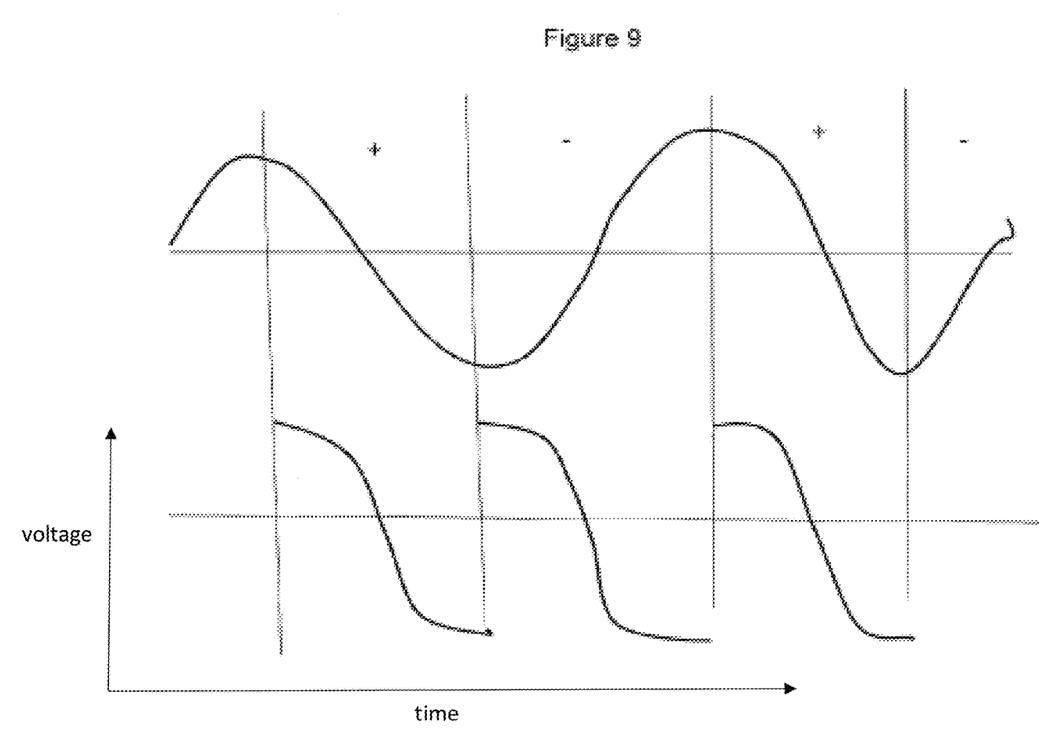
FIG. 9 illustrates a quadrature demodulator.

By way of comparison, FIG. 8 illustrates an in-phase demodulator. Alternating + and − signals for successive half cycles give a net DC output i.e. error signal. FIG. 9 illustrates a quadrature demodulator such as the demodulator 36 disclosed above. It can be seen that the alternating + and − signals now cancel out so that the net output i.e. error signal is now zero.

In the examples outlined above the open loop gain is improved, without reducing the resonant frequency, by operating a servo 32, 132 exactly on the critical voltage Vcrit where there is zero spring stiffness at low frequencies. The additional Vcrit servo 32, 132 locks the drive signals to Vcrit in a closed loop control method. Increasing the gain in this way at low frequency improves the bias stability.

It will be appreciated that any of the accelerometers described above may be constructed as a MEMS device, for example fabricated from silicon.

It will be understood that the description above is a description of non-limiting examples and that various changes and modifications may be made from the arrangements shown without departing from the scope of the disclosure, which is set forth in the accompanying claims.

The invention claimed is:
1. A closed loop method of controlling a capacitive accelerometer comprising a proof mass moveable relative to first and second fixed capacitor electrodes, the method comprising:
applying in-phase and anti-phase pulse width modulation (PWM) drive signals to the first and second fixed capacitor electrodes with an adjustable mark/space ratio;
operating in closed loop so that mechanical inertial forces are balanced by electrostatic forces to maintain an operating point of the proof mass at a null position;
detecting an output signal from the accelerometer representing a displacement of the proof mass from the null position to provide a error signal;
using the error signal so as to vary the mark/space ratio of the PWM drive signals so that the output signal from the accelerometer is proportional to an acceleration;
adding a sine wave modulation at a frequency f to the output signal from the proof mass before providing the error signal;
further detecting a phase shift resulting from the sine wave modulation at the frequency f so as to recognise a critical drive signal magnitude Vcrit representing the null position; and
providing a Vcrit control signal so as to adjust a magnitude of the PWM drive signals applied to the first and second fixed capacitor electrodes, or applying a separate, adjustable drive signal to at least one further fixed capacitor electrode, to lock to the Vcrit and thereby optimise open loop gain.
2. A closed loop method according to claim 1, comprising:
directly adjusting the magnitude of the PWM drive signals applied to the first and second fixed capacitor electrodes to lock to the Vcrit.
3. A closed loop method according to claim 1, comprising:
adjusting a magnitude of the drive signal applied to at the least one further fixed capacitor electrode to lock to the Vcrit.
4. A closed loop method according to claim 3, wherein the at least one further fixed capacitor electrode is independent of the first and second fixed capacitor electrodes.
5. A closed loop method according to claim 1, further comprising:
adding a quadrature signal S3, that is in 90° anti-phase to a modulation signal S1, after providing the error signal.
6. A closed loop method according to claim 1, further comprising:
adding a quadrature signal S3, that is in 90° anti-phase to a modulation signal S1, before providing the Vcrit control signal.
7. A closed loop method according to claim 5, comprising:
extracting the output signal and subtracting a signal S4 that is in-phase with the modulation signal S1.
8. A closed loop method according to claim 7, further comprising:
providing the extracted output signal as a measurement of the acceleration acting on the proof mass.

9. An accelerometer closed loop control system comprising:
- a capacitive accelerometer comprising a proof mass moveable relative to first and second fixed capacitor electrodes;
- a pulse width modulation (PWM) generator arranged to apply in-phase and anti-phase PWM drive signals to the first and second fixed capacitor electrodes with an adjustable mark/space ratio;
- a PWM servo operating in closed loop so that mechanical inertial forces are balanced by electrostatic forces to maintain an operating point of the proof mass at a null position;
- an output signal detector arranged to detect an output signal from the accelerometer representing a displacement of the proof mass from the null position to provide an error signal, wherein the PWM servo uses the error signal to vary the mark/space ratio of the PWM drive signals so that the output signal from the accelerometer is proportional to an acceleration;
- a modulator arranged to add a sine wave modulation at a frequency f to the output signal before providing the error signal to the PWM servo; and
- a Vcrit servo arranged to:
  (i) detect a phase shift resulting from the sine wave modulation at the frequency f so as to recognise a critical drive signal magnitude Vcrit representing the null position; and
  (ii) provide a Vcrit control signal to adjust a magnitude of the PWM drive signals applied to the first and second fixed capacitor electrodes, or to apply a separate drive signal to a further fixed capacitor electrode, to lock to the Vcrit and thereby optimise open loop gain.

10. A closed loop control system according to claim 9, wherein the Vcrit servo is arranged to adjust a magnitude of the drive signal applied to the at least one further fixed capacitor electrode.

11. A closed loop control system according to claim 10, wherein:
- each of the first and second fixed capacitor electrodes comprises a plurality of laterally spaced, fixed capacitive electrode fingers arranged to interdigitate with a set of laterally spaced, moveable capacitive electrode fingers extending from the proof mass; and
- the at least one further fixed capacitor electrode comprises a plurality of laterally spaced, fixed capacitive electrode fingers that are not interdigitated with the moveable capacitive electrode fingers.

12. A closed loop control system according to claim 9, further comprising a demodulator arranged to add a quadrature signal S3, that is in 90° anti-phase to a modulation signal S1, after providing the error signal.

13. A closed loop control system according to claim 9, further comprising a demodulator arranged to add a quadrature signal S3, that is in 90° anti-phase to a modulation signal S1, before providing the Vcrit control signal.

14. A closed loop control system according to claim 9, further comprising an output signal extractor arranged to subtract a signal S4 that is in-phase with a modulation signal S1.

15. A closed loop control system according to claim 14, wherein the output signal extractor provides a measurement of the acceleration acting on the proof mass.

* * * * *